(12) United States Patent
Haas et al.

(10) Patent No.: US 10,862,227 B2
(45) Date of Patent: Dec. 8, 2020

(54) CONNECTION ADAPTER FOR ELECTRICAL PLUG

(71) Applicant: Wieland Electric GmbH, Bamberg (DE)

(72) Inventors: Edwin Haas, Hausen (DE); Dharmesh Patel, Brampton (CA); Noaman Makki, Kleinburg (CA); Steven Hughes, Cambridge (CA)

(73) Assignee: WIELAND ELECTRIC GMBH, Bamberg (DE)

( * ) Notice: Subject to any disclaimer, the term of this patent is extended or adjusted under 35 U.S.C. 154(b) by 0 days.

(21) Appl. No.: 16/510,772

(22) Filed: Jul. 12, 2019

(65) Prior Publication Data

US 2019/0341703 A1 Nov. 7, 2019

Related U.S. Application Data

(63) Continuation-in-part of application No. 15/593,759, filed on May 12, 2017, now Pat. No. 10,559,895.

(30) Foreign Application Priority Data

Mar. 15, 2017 (DE) .................. 20 2017 101 492 U

(51) Int. Cl.
  *H01R 4/66* (2006.01)
  *H02G 15/076* (2006.01)
  *H01R 13/648* (2006.01)
  *H01R 4/18* (2006.01)

(52) U.S. Cl.
  CPC ............... *H01R 4/66* (2013.01); *H01R 4/184* (2013.01); *H01R 13/648* (2013.01); *H02G 15/076* (2013.01)

(58) Field of Classification Search
  None
  See application file for complete search history.

(56) References Cited

U.S. PATENT DOCUMENTS

| | | | | | |
|---|---|---|---|---|---|
| 4,229,063 | A | * | 10/1980 | Yoshizawa | H01R 4/62 439/442 |
| 4,531,807 | A | * | 7/1985 | Trigon | H01R 13/5213 439/866 |
| 5,245,132 | A | * | 9/1993 | Luetzow | H01R 4/184 174/126.2 |
| 5,956,445 | A | * | 9/1999 | Deitz, Sr. | G02B 6/441 174/24 |
| 6,485,335 | B1 | * | 11/2002 | Dewdney | H01R 9/034 439/578 |

(Continued)

*Primary Examiner* — Daniel P Wicklund
*Assistant Examiner* — Muhammed Azam
(74) *Attorney, Agent, or Firm* — Millman IP Inc.

(57) ABSTRACT

In an aspect, a connection adapter is provided for connecting an earthing line to a metal protective hose, where the adapter includes an electrically conductive cylindrical body having an end face with an opening therein for passage of electrical conductors and the earthing line therethrough, and a receiving shoe connected to the end face, which is configured to seat the earthing line. The cylindrical body includes a plurality of inwardly facing tabs and is sized to fit over the metal protective hose. The tabs are configured to contact and slide over the metal protective hose so as to ensure an electrical connection is present between the metal protective hose and the earthing line.

7 Claims, 5 Drawing Sheets

(56) References Cited

U.S. PATENT DOCUMENTS

| | | | | |
|---|---|---|---|---|
| 6,765,148 B2* | 7/2004 | Rix | ............... | F16B 5/0642 |
| | | | | 16/2.2 |
| 9,520,214 B2* | 12/2016 | Nakai | ............... | H02G 3/0481 |
| 9,966,708 B1* | 5/2018 | Gretz | ............... | H01R 4/64 |
| 10,027,239 B2* | 7/2018 | Wang | ............... | H02M 5/452 |
| 2002/0038511 A1* | 4/2002 | Kuwayama | ............ | H01R 4/184 |
| | | | | 29/861 |
| 2002/0049006 A1* | 4/2002 | Zhao | ............... | H01R 11/22 |
| | | | | 439/843 |
| 2002/0187686 A1* | 12/2002 | Zhao | ............... | H01R 11/22 |
| | | | | 439/843 |
| 2003/0124887 A1* | 7/2003 | Bloomfield | ............ | H01R 4/66 |
| | | | | 439/92 |
| 2005/0239319 A1* | 10/2005 | Takasu | ............... | H01R 24/44 |
| | | | | 439/394 |
| 2009/0035991 A1* | 2/2009 | Sakaguchi | ............ | H01R 4/184 |
| | | | | 439/585 |
| 2016/0254626 A1* | 9/2016 | Demazeau | ............ | H01R 4/18 |
| | | | | 439/34 |
| 2016/0285187 A1* | 9/2016 | Oba | ............... | H01R 4/023 |
| 2017/0141489 A1* | 5/2017 | Hadjiharalambous | ... | H01R 4/66 |
| 2018/0183190 A1* | 6/2018 | Volkmann | ............... | H01R 4/184 |

* cited by examiner

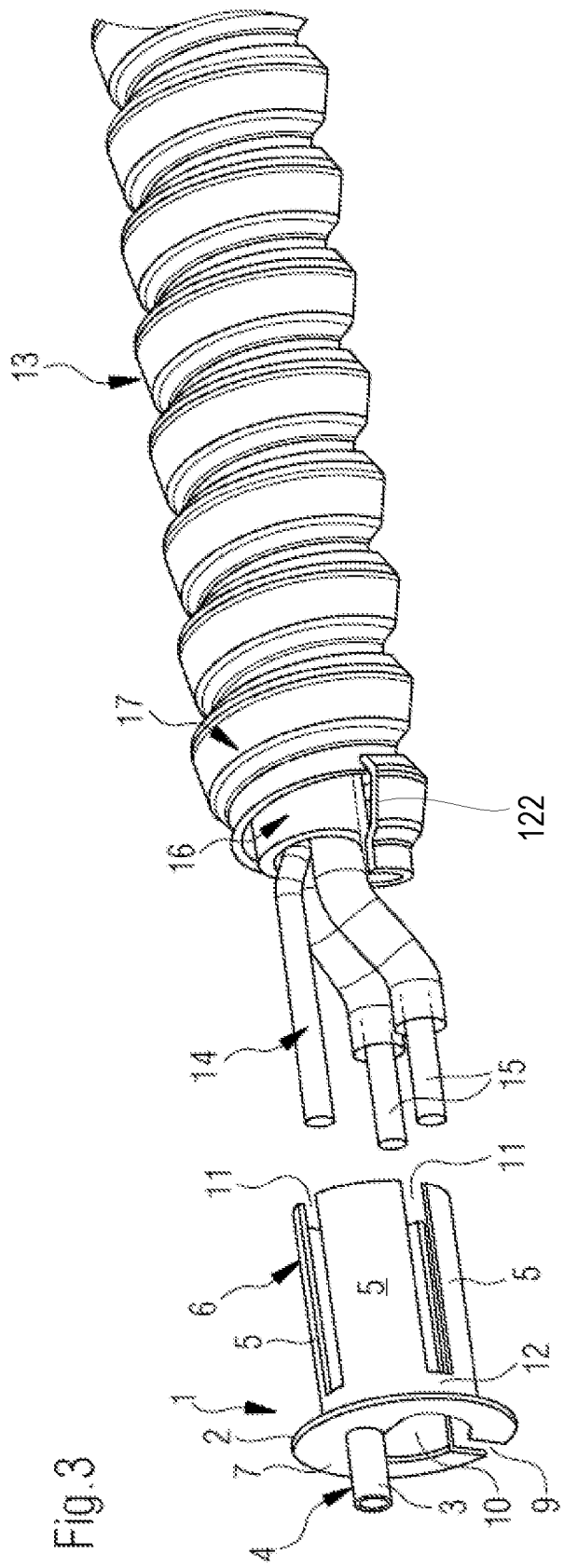

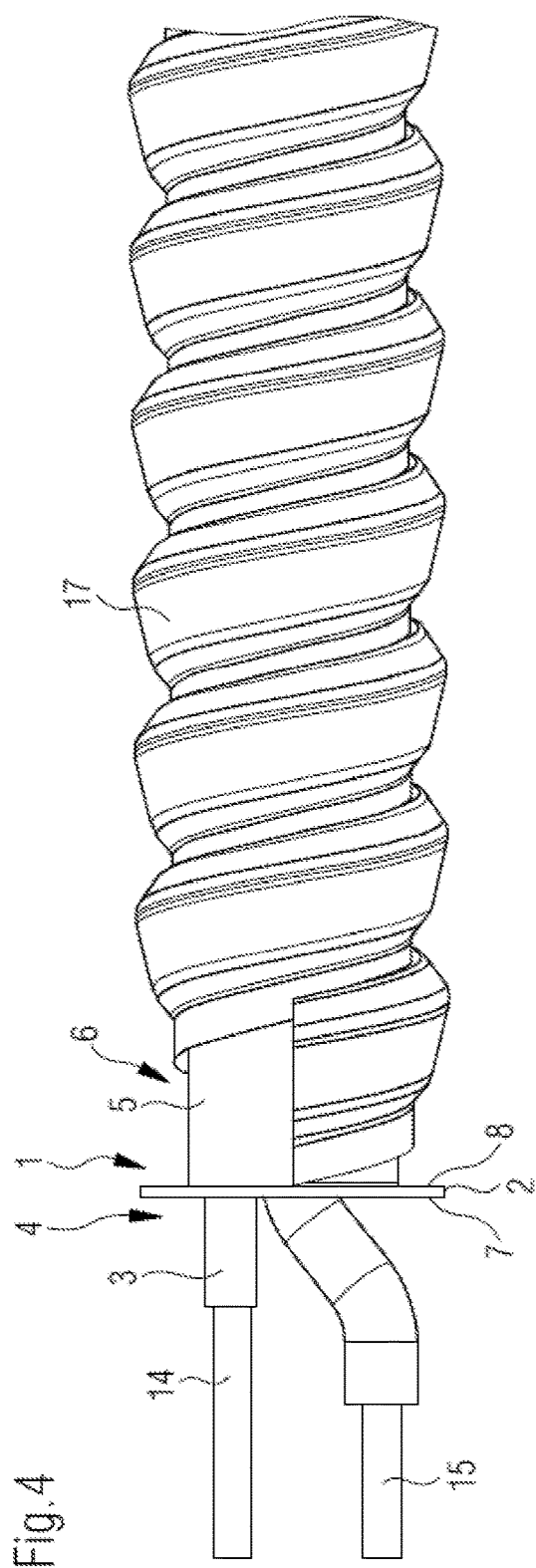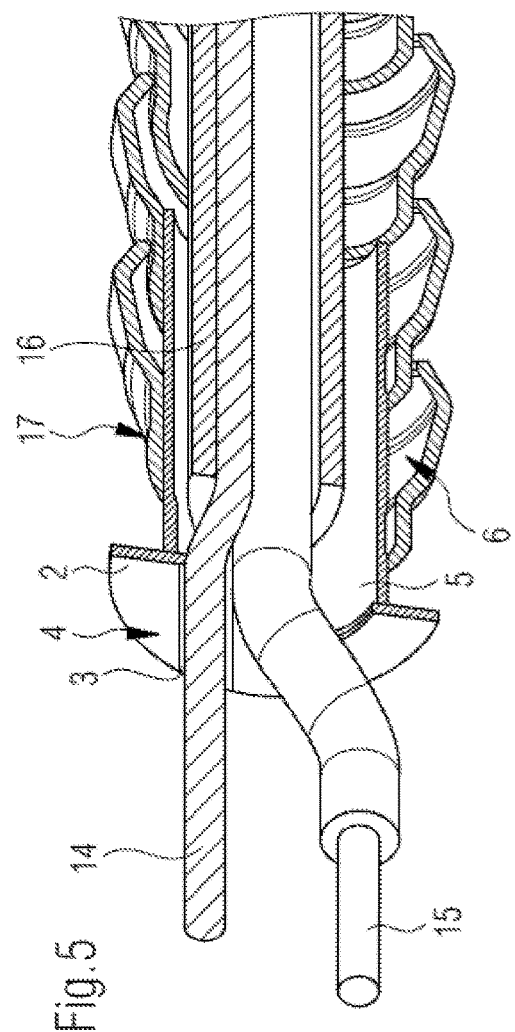

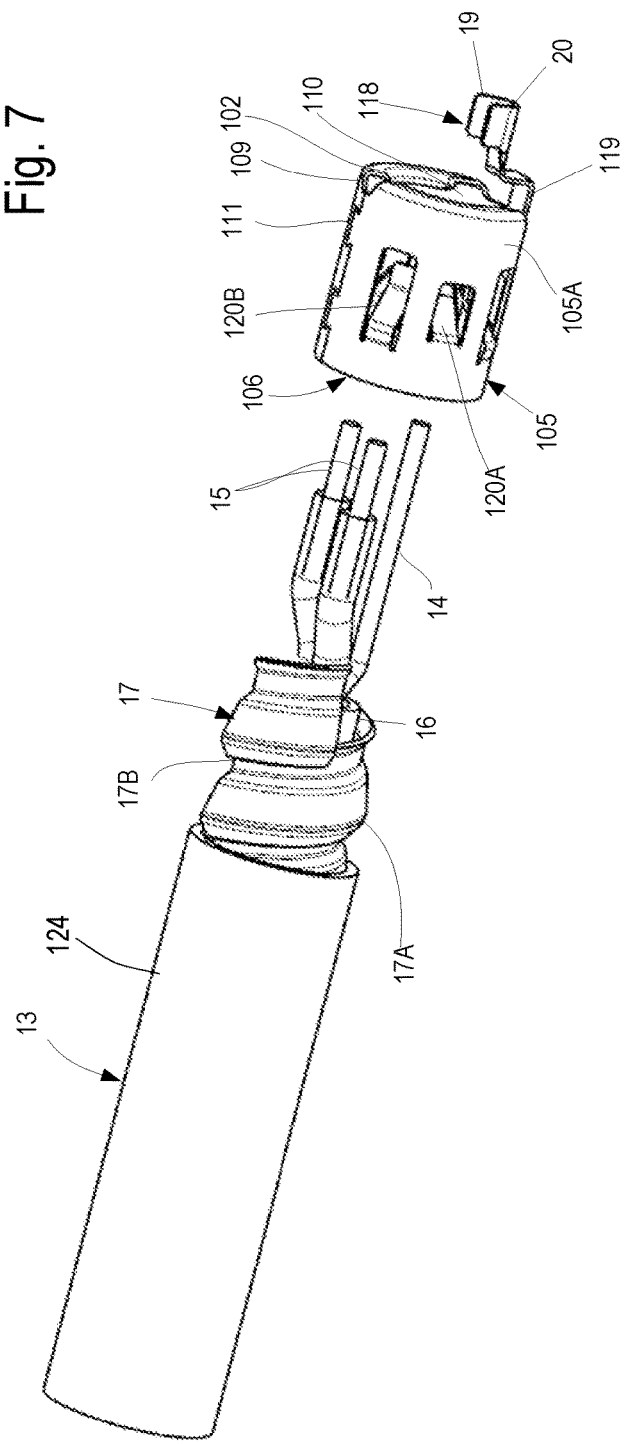

CONNECTION ADAPTER FOR ELECTRICAL PLUG

CROSS-REFERENCE TO RELATED APPLICATIONS

This application is a Continuation-In-Part of and claims the benefit of and priority to U.S. patent application Ser. No. 15/593,759, filed on May 12, 2017, which claims the benefit of and priority to German Patent Application No. 20 2017 101 492.4, filed on Mar. 15, 2017, entitled "ANSCHLUSSADAPTER," the disclosure of which is hereby incorporated herein by reference in its entirety.

FIELD OF THE DISCLOSURE

The invention relates to a connection adapter for an earthing line on a metal protective hose.

BACKGROUND OF THE DISCLOSURE

Metal protective hoses of this type are also referred to as conduits in installation technology. These metal protective hoses or conduits, because of corresponding standards, are used in Anglo-Saxon and Asiatic countries, especially in Great Britain, North America and Canada.

These conduits can be designed both as metal tubes and as plastics material tubes or metal hoses or plastics material hoses. A metal hose designed in the manner of a corrugated tube is used particularly frequently as a conduit. A metal profile is often coiled to form a hose, such that the finished metal hose has a coiled thread-like outer sheath. Electrical lines, for example for installation in buildings, are introduced into the metal hoses or conduits. These electrical lines then lie well protected in the conduits and are laid in the cable ducts of buildings. The earthing of the conduit with its electrical lines then also takes place by means of the cable ducts.

A protective hose of this type is known, for example, from the European patent stemming from the applicant having the publication number EP 2 499 705 and the title "electrical plug connector". In this case, the metal protective hose is connected indirectly to the earthing line. Disclosed therein are, specifically, a comb-like and a fork-like earthing contact, which rest with the comb prongs or fork prongs on the metal hose and, at the end thereof remote from the metal hose, in each case have a contact lug, which can be contacted with the aid of a cable shoe or the like. The earthing contact is, so to speak, interposed between the metal hose and the actual earthing line.

A further solution also stems from the applicant and is the subject of the German utility model having the reference number 20 2015 106 155.2 and the title "fastening device". This solution is based on the basic idea of directly contacting the outer sheath of the protective hose. For this, the end of the earthing line is designed as an earthing contact. In this case, the end of the earthing line is connected, preferably screwed, by means of a contact part to the outer sheath of the corrugated tube.

SUMMARY OF THE DISCLOSURE

An object of the present disclosure is to further simplify the earthing contact and its method of installation.

According to one aspect of the invention a connection adapter is provided comprising a line contact which is connected to an earthing line and comprising a hose contact which is connected to a protective hose. The line contact, for connection to the earthing line, has at least one ring segment, which rests on the outer sheath of the earthing line. The hose contact in turn has a contact tab, which in turn rests on the inner sheath of the protective hose. The line contact and the hose contact are connected to one another in terms of the line such that the protective hose is earthed with the aid of the connection adapter by means of the earthing line.

In a preferred embodiment, the line contact and the hose contact are designed in one piece.

In a further preferred embodiment, the ring segment of the line contact resting on the earthing line is completed to form a closed ring. The closed ring of the line contact thus surrounds the entire outer sheath of the earthing line and therefore rests peripherally on the earthing line.

In a further advantageous configuration, provided on the line contact is a ring sleeve, through which the earthing line is inserted. The ring sleeve is preferably designed as a crimped sleeve, such that the earthing line can firstly be pushed without problems through the sleeve and the sleeve is then pressed, therefore ensuring that the inner sheath of the ring sleeve rests in a friction-locking manner on the outer sheath of the earthing line. The earthing line is therefore guided well in the line contact and firmly fixed, which facilitates the assembly of the earthing line on the line contact and increases the safety of use of the line contact.

In a further advantageous configuration, a flange-like disc acts, as it were, as the carrier of the ring sleeve and the contact tab. The flange-like disc is pierced by a line bore aligning with the ring sleeve. The ring sleeve is arranged on the one disc face in continuation of the line bore. The contact tab is arranged on the counter-face remote from the disc face. In an advantageous configuration, the ring sleeve and the contact tab in each case protrude, remote from one another, perpendicularly out of the relevant face of the flange-like disc.

To improve the electrical contact with the protective hose, in a preferred configuration, a plurality of contact tabs arranged next to one another on a circular line are provided. In order to adapt the connection adapter with the aid of a force fit in the protective hose, the diameter of the circular line formed by the contact tabs arranged next to one another is slightly larger than the internal diameter of the protective hose. To shield the lines in the protective hose, an insulating sheath surrounding the lines is provided. The contact tab or the contact tabs are then inserted for fixing between the outer sheath of the insulating sheath and the inner sheath of the protective hose.

To further improve the fit of the connection adapter in the protective hose, the contact tabs are designed as bending rod springs in an advantageous configuration. In the final assembled state, the connection adapter according to the invention, under the centrifugal spring pressure of the contact tabs, then advantageously lies with its contact tabs between the insulating sheath and the protective sheath in the protective hose and is crimped with the earthing line by means of the ring sleeve.

According to another aspect of the disclosure a connection adapter is provided for connecting an earthing line to a metal protective hose, where the adapter includes an electrically conductive substantially hollow cylindrical body having an end face with a pass-through opening therein for passage of electrical conductors and the earthing line therethrough, and a receiving shoe connected to the end face, which is configured to seat the earthing line. The cylindrical body includes a plurality of inwardly facing tabs and is sized to fit over the metal protective hose. The tabs are configured to contact and slide over the metal protective hose.

BRIEF DESCRIPTIONS OF THE DRAWINGS

The invention will be described in further detail with reference to the embodiments shown in the figures of the drawings, in which:

FIG. 3 is a side view of the connection adapter and a connection line with a conduit before assembly;

FIG. 4 shows the elements from FIG. 3 in the final assembled position thereof;

FIG. 5 is a sectional view of the connection line from FIG. 4;

FIG. 7 is a side view of a connection adapter according to a second embodiment of the invention and a connection line with a conduit before assembly; and FIG. 8 shows the elements from FIG. 7 in the final assembled position thereof.

DETAILED DESCRIPTION

Figure 1:
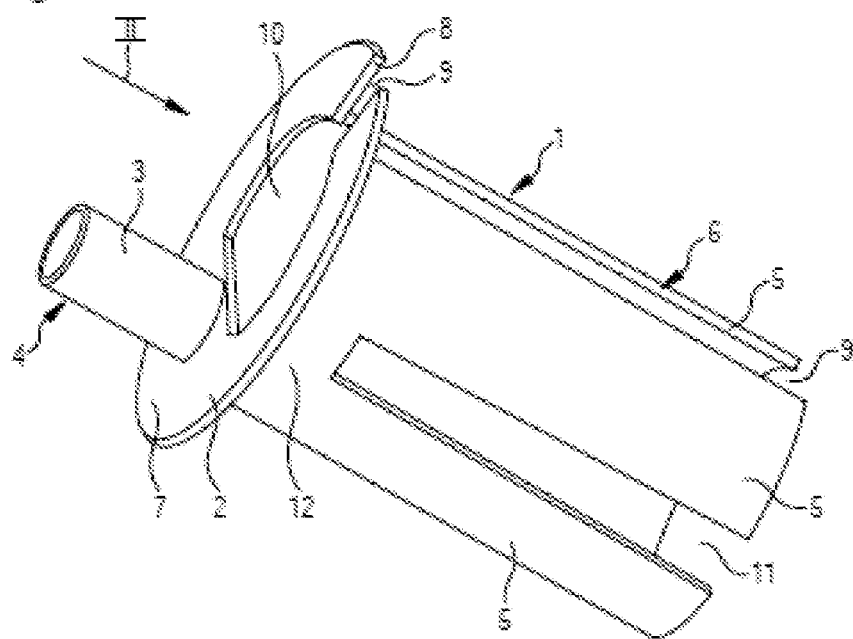
FIG. 1 is a side view of the connection adapter according to an embodiment of the invention.
Figure 2:
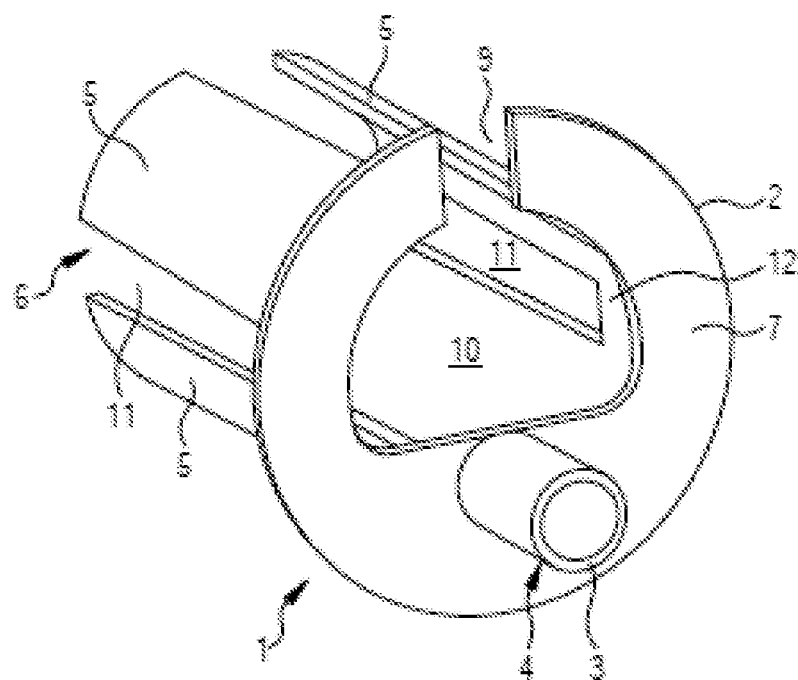
FIG. 2 is a further view of the connection adapter shown in FIG. 1 from the perspective of the viewing arrow II.

Connection adapter 1 has a central flange-like disc 2, a ring sleeve 3 as the line contact 4 and a plurality of contact tabs 5 as the hose contact 6. The ring sleeve 3 projects perpendicularly from the disc face 7 of the disc 2. The counter-face 8, from which in turn the individual contact tabs 5 project perpendicularly, is remote from the disc face 7. The disc 2 is slotted by a slot 9. The slot 9 widens towards the centre of the disc 2 to form a cable through-opening 10.

A cylindrical body firstly protrudes from the counter-face 8. Longitudinal slots 11 are introduced into this cylindrical body in such a way that a ring collar 12 directly adjoining the counter-face 8 is produced, which acts as a fixed bearing for the contact tabs 5 designed in the manner of bending rod springs and projecting from the disc 2.

The electrical line 13 depicted on the right in FIG. 3 in turn consists of the earthing line 14, the two electrical conductors 15, the insulating sheath 16 surrounding the two electrical conductors 15 and the earthing line 14, and the metal protective hose 17, which in turn sheaths the insulating sheath 16 and is also referred to as a conduit. For assembly, the earthing line 14 is firstly pushed from the counter-face 8 through the ring sleeve 3 through a line bore (not shown in the drawings). At the same time, the electrical conductors 15 are pushed through the cable through-opening 10. Furthermore, the spring-like contact tabs 5 are pressed together in such a way that the free ends thereof remote from the disc 2 slide into the gap between the insulating sheath 16 and the metal protective hose 17. As the diameter of the ring projection 12 mounting the contact tabs 5 is slightly larger than the internal diameter of the metal protective hose 17, the deflected contact tabs 5 and, if necessary, the adapter 1 pressed together radially along the slot 9, can then be inserted into the gap between the insulating sheath 16 and the metal protective hose 17 and then, under the centrifugal spring pressure thereby being produced, rest closely on the inner sheath of the metal protective hose 17. When the connection adapter 1 is completely inserted in the metal protective hose 17, the ring sleeve 3 is finally crimped with the aid of crimping pliers (not shown in the drawings) such that the ring sleeve 3 firmly clips round the earthing line 14 and thus a displacement of the earthing line 14 along the ring sleeve 3 is effectively prevented. As the connection adapter 1 is manufactured from electrically conductive material, a direct electrical connection between the earthing line 14, on the one hand, and the metal protective hose 17, on the other hand, exists by means of the contact tab 5, the disc 2 and the ring sleeve 3.

Figure 6:
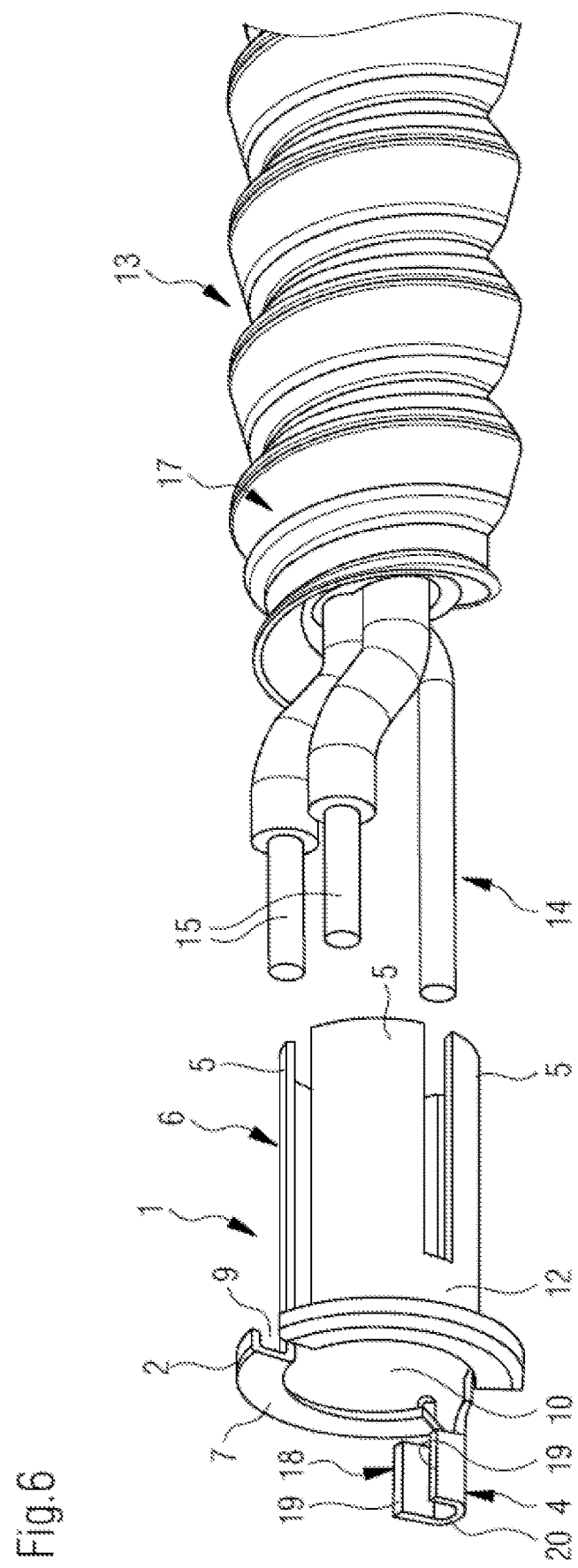
FIG. 6 is a side view of an alternative embodiment of a connection adapter and a connection line with a conduit before assembly.

FIG. 6 finally shows an embodiment that is modified in relation to the embodiment of the connection adapter shown in FIG. 1 to FIG. 5. The view of FIG. 6 substantially corresponds to the view of FIG. 3, both the connection adapter 1 and the electrical line 13 being rotated by 180 degrees. In the view of FIG. 6, the ends of the electrical conductors 15 extend above the earthing line 14. While the ring sleeve 6 in the embodiment according to FIG. 3 is arranged in the "12 o'clock" position, in the embodiment according to FIG. 6, a receiving shoe 18 is arranged in the "6 o'clock" position. In this case, the receiving shoe 18 functionally corresponds to the ring sleeve 3. The receiving shoe 18 is designed as a ring segment-like line contact 4. The receiving shoe 18 is U-shaped in cross section, the two U-sides 19 laterally flanking the earthing line 14 in the final assembled state, while the earthing line 14 rests on the U-base 20 connecting the U-sides 19. In the final assembled state, the U-sides 19 of the receiving shoe 18 can be moved towards one another 5 with the aid of pliers, in particular crimping pliers in the manner of clamping wings, and thus fix the earthing line 14 between them in a clamping manner.

FIGS. 7 and 8 show an alternative connection adapter 100 which has a radially inwardly directed flange 102, a receiving shoe 118 as the line contact 104, and a substantially hollow cylindrical body 105 as the hose contact 106. The cylindrical body 105 is disposed on one side of the radially inwardly directed flange 102 and the receiving shoe 118 is disposed on the opposite side of the radially inwardly directed flange 102.

Receiving shoe 118, similar to receiving shoe 18, projects from an axially outwardly facing flange face 107 of the radially inwardly directed flange 102. Receiving shoe 118, however, is formed from a strip 119 that extends from a peripheral wall 105A of the cylindrical body 105 and has two substantially 90 degree bends so as to position the receiving shoe 118 inwards of the peripheral wall 105A. The terminating portion of the receiving shoe 118 is U-shaped featuring two flanking side walls 19 straddling the connecting U-base 20.

The flange-like disc 102 includes a cable-through opening 110. The disc 102 includes a slot 109 which extends into the peripheral wall 105A of the cylindrical body 105. The cylindrical body 105 is preferably formed by stamping a sheet stock (not shown), resulting in an undulating parting line 111 along the periphery wall 105A of the cylindrical body 105. The slot 109 intersects the parting line 111

The peripheral wall 105A of the cylindrical body 105 is punched at various circumferential positions to introduce two types of inwardly facing tabs 120A, 120B. Tab 120A is a shorter (relative to tab 120B) flat strip that is angled inwardly (relative to the peripheral wall of the cylindrical body 105) from about 15 degrees to about 75 degrees, and more preferably about 30-60 degrees. Tab 120a functions as a locking tab as described in greater detail below. Tab 120B is a longer (relative to tab 120a) strip that is angled inwardly (relative to the peripheral wall of the cylindrical body 105) from about 15 degrees to about 75 degrees, and more preferably about 30-60 degrees. The strip of tab 120b has two opposite bends therein and functions as a tightening tab as described in greater detail below.

In assembling the connection adapter 100 to the electrical line 13, it will be seen that the cylindrical body 105 slides over the metal protective hose 17. The metal protective hose 17 is formed through the curling of a crested extrusion 122 (see FIG. 3), resulting in the metal protective hose 17 having an undulating outer envelope with alternating peaks 17A and valleys 17B therein. In the process of assembly, the tabs 120A, 120B can deflect over the peak(s) 17A to allow the cylindrical body 105 to fit over the metal protective hose 17. The locking tabs 120A will wedge into one of the valleys 17B preventing the cylindrical body 105 from being slid off of the metal protective hose 17. The tightening tabs 120B are resilient and provide a gripping force between the connection adapter 100 and the metal protective hose 17. In other words, when the connection adapter 100 is fitted over the metal protective hose 17 the tabs 120A, 120B apply a force on the metal protective hose 17.

The electrical conductors 15 and the earthing line 14 are passed through the cable-through opening 110, with the earthing line 14 seated against the receiving shoe 118.

Final assembly requires two crimping operations via pliers or the like. The receiving shoe 118 is crimped to clamp the earthing line 14. The cylindrical body 105 is also crimped against the metal protective hose 17, whereby the parting line 111 and punches in the peripheral wall 105A enable the cylindrical body 105 to deform somewhat to contour against the metal protective hose 17.

Upon assembly, the connection adapter 100, which is formed from an electrically conductive material, provides earthing continuity between the earthing line 14 and the metal protective hose 17, allowing a plastic plug to be mounted over the connection adapter 100 for the purpose of connecting the electrical conductors 15 and the earthing line 14 to other power cables or to plug receptacles. The connection adapter 100 is easier to install in practice than connection adapter 1 because there is no need to insert any portion of the adapter in the tight space between the insulating sheath 16 and metal protective hose 17.

The electrical line 13 shown in FIGS. 7 and 8 includes an outer sheath shown at 124. This outer sheath 124 may be provided in embodiments in which the electrical cable 13 is used in outdoor applications. In other instances, such as for indoor use, the electrical cable 13 may be provided without the outer sheath 124. The outer sheath 124 may be made from an electrically insulative material such as a polymeric material with good resistance to degradation in its ambient environment (e.g. due to exposure to the sun, to temperature fluctuations, to precipitation, and/or any other potential issue that can arise in an outdoor application).

Persons skilled in the art will appreciate that there are yet more alternative implementations and modifications possible, and that the above examples are only illustrations of one or more implementations. The scope, therefore, is only to be limited by the claims appended hereto and any amendments made thereto.

| List of reference numerals | |
|---|---|
| 1 | connection adapter |
| 2 | disc |
| 3 | ring sleeve |
| 4 | line contact |
| 5 | contact tab |
| 6 | hose contact |
| 7 | disc face |
| 8 | counter-face |
| 9 | slot |
| 10 | cable through-opening |
| 11 | longitudinal slot |
| 12 | ring collar |
| 13 | electrical line |
| 14 | earthing line |
| 15 | electrical conductor |
| 16 | insulating sheath |
| 17 | protective hose |
| 18 | receiving shoe |
| 19 | U-side |
| 20 | U-base |
| 100 | connection adapter |
| 102 | disc |
| 104 | line contact |
| 105 | cylindrical body |
| 105A | peripheral wall |
| 106 | hose contact |
| 107 | disc face |
| 109 | slot |
| 110 | cable through-opening |
| 111 | parting line |
| 118 | receiving shoe |
| 119 | strip |
| 120A | locking tab |
| 120B | tightening tab |
| 122 | Extrusion |

The invention claimed is:

1. A connection adapter for connecting an earthing line to a metal protective hose, comprising:
    an electrically conductive substantially hollow cylindrical body ending at a first side of an end face that extends radially inwardly from the cylindrical body and is positioned to limit a distance over which the connection adapter can extend on the metal protective hose, wherein the end face has a pass-through opening therein that is sized for passage of a plurality of separately sheathed electrical conductors and the earthing line therethrough; and
    a receiving shoe extending away from the cylindrical body past a second side of the end face, the receiving shoe being configured to seat the earthing line,
    wherein the cylindrical body includes a plurality of inwardly facing tabs, the cylindrical body being sized to fit over the metal protective hose and the tabs being configured to contact and slide over the metal protective hose.

2. A connection adapter according to claim 1, wherein the receiving shoe is shaped to be crimped to the earthing line to fasten the connection adapter to the earthing line.

3. A connection adapter according to claim 1, wherein the cylindrical body is shaped to be crimped to fasten the connection adapter to the metal protective hose.

4. A connection adapter according to claim 3, wherein the cylindrical body is formed from sheet stock and has a parting line therein.

5. A connection adapter according to claim 1, wherein the tabs are formed by punching a wall forming the cylindrical body.

6. A connection adapter according to claim 1, wherein the metal protective hose has an undulating envelope featuring peaks and valleys and at least one of the tabs is a locking tab which, when the cylindrical body is fitted over the metal protective hose, wedges in one of the valleys preventing the cylindrical body from backing out off the metal protective hose.

7. A connection adapter according to claim 1, wherein at least one of the tabs is resilient, such that, when the connection adapter is fitted over the metal protective hose the tabs apply a force on the metal protective hose.

\* \* \* \* \*